(12) United States Patent
Bartlett

(10) Patent No.: US 7,350,189 B1
(45) Date of Patent: Mar. 25, 2008

(54) AUTOMATIC LATCH OF SIGNAL ATTRIBUTES IN MODELING AND EXECUTION ENVIRONMENTS

(75) Inventor: Andrew C. Bartlett, Westborough, MA (US)

(73) Assignee: The MathWorks, Inc., Natick, MA (US)

( * ) Notice: Subject to any disclaimer, the term of this patent is extended or adjusted under 35 U.S.C. 154(b) by 815 days.

(21) Appl. No.: 10/719,904

(22) Filed: Nov. 21, 2003

(51) Int. Cl.
*G06F 9/44* (2006.01)
*G06F 9/45* (2006.01)
*G06F 3/048* (2006.01)

(52) U.S. Cl. ............ 717/104; 717/105; 717/109; 717/113; 703/22; 715/763

(58) Field of Classification Search ........ 717/104–114, 717/131–133; 703/1–3, 22; 715/763
See application file for complete search history.

(56) References Cited

U.S. PATENT DOCUMENTS

| | | | |
|---|---|---|---|
| 2002/0083413 A1* | 6/2002 | Kodosky et al. | 717/109 |
| 2002/0120921 A1* | 8/2002 | Coburn et al. | 717/140 |
| 2002/0166110 A1* | 11/2002 | Powell | 717/106 |
| 2004/0148587 A1* | 7/2004 | Conrad et al. | 717/108 |
| 2004/0210426 A1* | 10/2004 | Wood | 703/2 |
| 2005/0039170 A1* | 2/2005 | Cifra et al. | 717/125 |

OTHER PUBLICATIONS

The MathWorks, "Simulink," 2001.*
dSpace, "TargetLink New Features and Migration," Sep. 2001.*

* cited by examiner

*Primary Examiner*—Meng-Al T. An
*Assistant Examiner*—Insun Kang
(74) *Attorney, Agent, or Firm*—Lahive & Cockfield, LLP

(57) ABSTRACT

Methods and systems for automatically locking down the attributes of signals in modeling and execution systems are disclosed. Signal attributes automatic latch components are placed on the path of the signals. The signal attributes automatic latch components automatically collect all of the information on the attributes of the signals and lock down the attributes of the signals. Alternatively, automatic signal attributes latch functions may be implemented in components, such as input and output port components. The components perform the automatic signal attributes latch functions that enable the components to automatically collect all of the information on the attributes of the signals and lock down the attributes of the signals. If the attributes of the signals are locked down, even if the design of a target system is changed, the locked attributes of the signals do not change.

31 Claims, 7 Drawing Sheets

AUTOMATIC LATCH OF SIGNAL ATTRIBUTES IN MODELING AND EXECUTION ENVIRONMENTS

FIELD OF THE INVENTION

The present invention relates generally to modeling and execution environments and more particularly to methods and systems for automatically collecting and locking down the attributes of signals in the modeling and execution environments.

BACKGROUND OF THE INVENTION

Computer systems may include interactive software tools that provide environments for the modeling and simulation of electrical, electronic, mechanical and software systems. The systems may be designed and simulated in textual or graphical environments, such as time-based block diagrams, data-flow diagrams, and state-based and flow diagrams, and other graphical models. Simulink® and Stateflow®, both from The MathWorks Inc. of Natick, Mass., are the exemplary software tools that provide time-based block diagrams and state-based and flow diagram modeling and execution environments. Data flow diagrams are used to describe how data flows between processes in a system. Data-flow diagrams describe a graphical programming paradigm where the availability of data (often thought of as tokens) is used to initiate the execution of blocks, where a block represents an operation and a line represents execution dependency describing the direction of data flowing between blocks.

Modern modeling and execution software tools are designed to be very flexible, which means that the models of systems or subsystems support various attributes of signals that are applied to/from the models. For example, if a model performs the function of computing the average value of ten signals (or variables), the model may compute the average value of the signals without regard to the attributes of the signals. When the implementation of a model can handle signals with a variety of attributes, the implementation is called "polymorphic." The polymorphic implementations make it easier for users to construct an initial model. However, at later stages, the polymorphism may complicate the testing process of the model because small localized design changes cause the attributes of signals to change throughout the model. Users should repeat all of the prior testing process to determine the signal attributes of the model changed. For a large design, the repetition process is rigorous, time consuming, and expensive.

In conventional modeling and execution systems, users partition the design of a model and lock down the attributes of the signals on the boundary between partitions to deal with the problem mentioned above. In the conventional modeling and execution systems, users manually enter all of the information on the attributes of the boundary signals and lock down the attributes of the boundary signals. This manual locking down process is laborious and error prone. Therefore, there is a need for modeling and execution systems that automatically collect all of the information on the attributes of the signals. There is also a need for modeling and execution systems that automatically lock down the attributes of the signals based on the information collected.

SUMMARY OF THE INVENTION

The present invention provides methods and systems for automatically collecting and locking down the attributes of signals in modeling and execution systems. One embodiment of the present invention provides signal attributes automatic latch components for automatically collecting and locking down the attributes of the signals. The signal attributes automatic latch components are placed on the path of the signals the attributes of which are to be collected and locked down. The signal attributes automatic latch components automatically collect all of the information on the one or more attribute of the signals and lock down one or more attribute of the signals.

The present invention may also implement automatic signal attributes latch functions into the models, such as input ports and output ports. The attributes latch functionality can be put anywhere on the signals path including in the "block" that contains the originating source port or any of the blocks containing destination ports. The models are located on the path of signals to perform their own functions in connection with the signals. The models also perform the automatic signal attributes latch functions that enable the models to automatically collect all of the required information on the attributes of the signals and lock down at least one attribute of the signals. If the attributes of the signals are locked down, even small changes in the design of systems or subsystems do not affect the locked attributes of the signals.

The present invention works with the Attributes Resolution System of the Modeling and Execution Environment. Typically, the attributes resolution system has two main phases. In the first phase, components set attributes that are known apriori. In the second phase, apriori attributes information is fed to an attributes propagation system. The attributes propagation system uses the apriori known information and propagation rules to determine all the attributes of all the signals.

In unlatched mode, the attributes latch component does not force the signal to have specific attributes. In unlatched mode, the attributes latch component does not provide apriori information to the Attributes Resolution System. Unlatched mode is useful for marking signal that may be trapped and latched at a later time. Unlatched mode is also useful for allowing a signal to get out of Latched or Trapped Mode without having to re-wire the block diagram.

In latched mode, the desired attributes of the signal are known, specified, and enforced. In latched mode, the desired attributes of the signal are provided as apriori information to the Attribute Resolution Systems first phase.

Trap Mode simply marks a signal saying take action at the next Attribute-Trap-Event. Prior to the Attribute-Trap-Event occurring, Trap Mode behaves like Unlatched Mode. When the Attribute-Trap-Event occurs, the required information about all the signals marked as being in Trap Mode is automatically collected. Next, the collected attribute information is automatically entered into each component that was in Trap Mode. Next, each component that was in Trap Mode is automatically switched to Latched Mode.

The Attribute-Trap-Event generally occurs based on some user action. However, it could also be automatically triggered based on other Events. A part of the present invention is an automatic way to find all the Attribute Latch Blocks that meet certain criteria and to switch them all to a different mode. For example, find all the attribute latch blocks in a specific subsystem that are in Latched Mode, and automatically switch them all to Trap Mode.

In an illustrative embodiment of the present invention, a method is provided for collecting and locking the attributes of signals in an electronic device that runs a software tool for the design and execution of a target system. A latch component is placed on the path of the signals wherein the signals flow through the latch component. The latch component is set to the Trap mode in which the latch component automatically collects the information on the attributes of the signals, and then the component is automatically switched from Trap mode to Latched mode. In the latched mode, the locked attributes of the signals do not change regardless of the changes in the design of the target system.

In another illustrative embodiment of the present invention, a different method is provided for automatically collecting and locking the attributes of signals in an electronic device that runs a software tool for the design and execution of a target system. A signal attributes automatic latch function is implemented in a component that is located on the path of the signals. The component is set to the Trap mode in which the component automatically collects the information on the attributes of the signals, and then the component is automatically switched from Trap mode to Latched mode. In the latched mode, the locked attributes of the signals do not change regardless of the changes in the design of the target system.

In still another illustrative embodiment of the present invention, a computer-readable medium is provided for holding instructions executable in a computer that runs a software tool for the design and execution of a target system. A signal attributes automatic latch component is placed on the path of the signals wherein the signals flow through the latch component. The latch component is set to the latch mode in which the latch component automatically collects the information on, and locks down, the attributes of the signals. In the latch mode, the locked attributes of signals do not change regardless of the changes in the design of the target system.

By providing signal attributes automatic latch components, or signal attributes automatic latch functions for components, the present invention enhances the efficiency of designing and testing polymorphic implementation of a model in modeling and execution systems.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION

The illustrative embodiment of the present invention concerns a modeling and execution system running on an electronic device in which the attributes of signals are automatically collect and locked down depending on the users' selection of the signals. The modeling and execution system provides "signal attributes automatic latch blocks" (hereinafter "latch blocks") that are placed on the path of the signals to automatically collect and lock down the attributes of the signals. The latch blocks are provided with various operation modes including Latched Mode, Unlatched Mode, Trap Mode, etc., and set to one of the modes depending on the users' selection. On the Trap Mode, the latch blocks depend on the Attribute Resolution System of the modeling and execution environment to determine the attributes of the signal. The information obtained from the Attribute Resolution System is automatically collected and stored in the latch block. The latch block is then automatically switched from Trap Mode to Latched Mode. In Latched Mode, the latch block uses the stored information to set and lock down the attributes of the signals.

The modeling and simulating system also provides signal attributes automatic latch functions for blocks, such as input port blocks and output port blocks. The blocks implementing the signal attributes automatic latch function are provided with as various modes as in the latch blocks described above. On the Trap Mode, the blocks implementing the signal attributes automatic latch functions depend on the Attribute Resolution System of the modeling and execution environment to determine the attributes of the signal. The information obtained from the Attribute Resolution System is automatically collected and stored in the block. The block implementing the signal attributes latch function is then automatically switched from Trap Mode to Latched Mode. In Latched Mode, the block implementing the attributes latch function uses the stored information to set and lock down the attributes of the signals. If the attributes of the signals are locked down by the latch block or the blocks with the signal attributes automatic latch functions, even small changes in the design of systems or subsystems do not cause the changes of the locked signal attributes.

Figure 1:
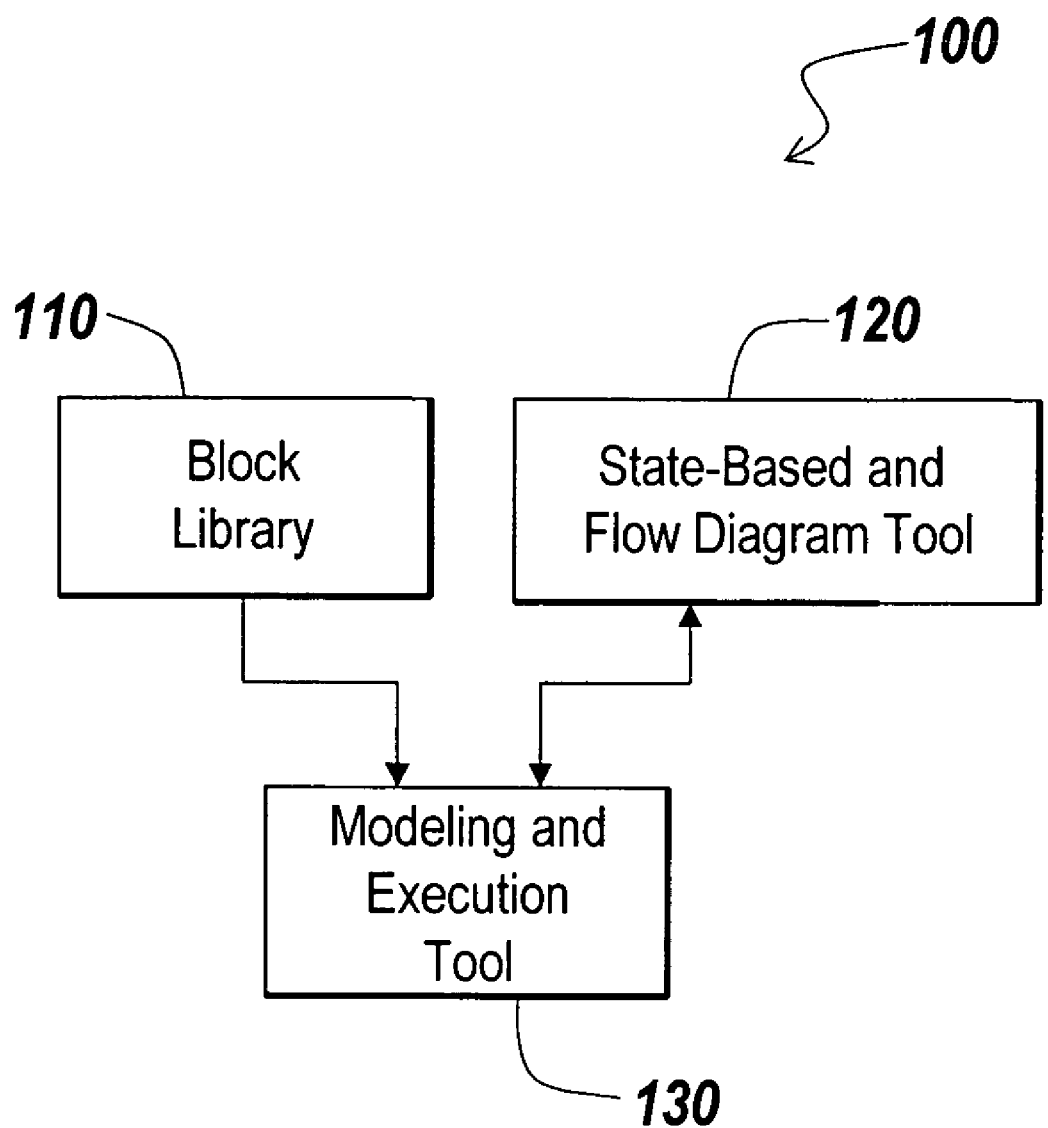
FIG. 1 is a block diagram representation of an exemplary modeling and execution system that provides the automatic latch of signal attributes in the illustrative embodiment of the present system.

FIG. 1 is a block diagram representation of an exemplary modeling and execution system 100 suitable for practicing the illustrative embodiment of the present invention. The system 100 includes a block library 110, a state-based and flow diagram tool 120 and a modeling and execution tool 130. One of skill in the art will appreciate that the modeling and execution system 100 is not limited to graphical modeling and execution systems, but rather includes any other modeling and execution systems, such as textual modeling and execution systems.

The block library 110 contains application specific models that support the modeling and execution of target systems. The block library 110 provides models of systems or subsystems that are incorporated into the target systems designed in the modeling and execution tool 130. The models provided from the block library 100 are represented in blocks in the illustrative embodiment of the present invention. One of skill in the art will appreciate that the models can be represented in other graphical symbols or textual symbols. The model blocks provided by the block library 110 include latch blocks for automatically collecting and locking down the attributes of signals. The block library 110 may also include other blocks, such as input port blocks and output port blocks, that implement the functions of automatically collecting and locking down the attributes of signals. One of skill in the art will appreciate that the blocks implementing the functions of automatically collecting and locking down the attributes of signals are not limited to the input and output port blocks and rather include any other blocks, such as signal probing blocks. An illustrative embodiment of the block library 110 may be found in Simulink® Blocksets, such as DSP Blockset, Fixed-point Blockset and Communications Blockset, from The MathWorks, Inc. of Natick, Mass. The Blocksets provide models and utilities for the development and integration of models for target systems and sub-systems of the target systems.

The state-based and flow diagram tool 120 provides a graphical execution environment for modeling and designing event-driven target systems. The state-based and flow diagram tool 120 enables users to generate state-based and flow diagrams that graphically represent hierarchical and parallel states and the event-driven transitions between the states of the target systems. Based on the state-based and flow diagrams created in the state-based and flow diagram tool 120, the modeling and execution tool 130 simulates the target systems and analyzes the behavior of the target systems. In the modeling and execution tool 130, the state-based and flow diagrams may exchange data, signals, and events with other state-based and flow diagrams. Stateflow®, from The MathWorks, Inc. of Natick, Massachusetts, is an example of the state-based and flow diagram tool 120.

The modeling and execution tool 130 provides a graphical simulation and prototyping environment for modeling, simulating, and analyzing target systems. The target systems are designed and simulated in the modeling and execution tool 130 using the model blocks provided from the block library 110 or the state-based and flow diagrams provided from the state-based and flow diagram tool 120. Simulink®, from The MathWorks, Inc. of Natick, Massachusetts, is an exemplary modeling and execution tool 130. The Blockset operates in Simulink®. Stateflow® is integrated with Simulink®, which enables each of the state-based and flow diagrams to be represented as its own block. This block interface allows the state-based and flow diagrams to exchange data, signals, and events with other blocks.

Simulink® enables users to design a block diagram of target systems, simulate the systems' behavior, analyze their performance, and refine the design. Simulink® allows users to design target systems through a user-interface that allows drafting block diagram models of the target systems. All of the blocks in the block library 110 are available to users when the users are building the block diagram of the target systems. Individual users may be able to customize this model block to: (a) reorganize blocks in some custom format, (b) delete blocks they do not use, and (c) add custom blocks they have designed. The blocks may be dragged through some human-machine interface (such as a mouse or keyboard) from the block library 110 on to the window (i.e., model canvas). Simulink® includes a block diagram editor that allows users to perform such actions as draw, edit, annotate, save, and print out block diagram representations of target systems. The block diagram editor is a graphical user interface (GUI) component that allows drafting of block diagram models by users. In Simulink®, there is also a textual interface with a set of commands that allow interaction with the graphical editor. Using this textual interface, users may write special scripts that perform automatic editing operations on the block diagram. Simulink® also allows users to simulate the designed target systems to determine the behavior of the systems. Simulink® includes a block diagram execution engine that carries out the task of compiling and linking the block diagram to produce an "in-memory executable" version of the model that is used for generating code and/or simulating a block diagram model.

Figure 2:
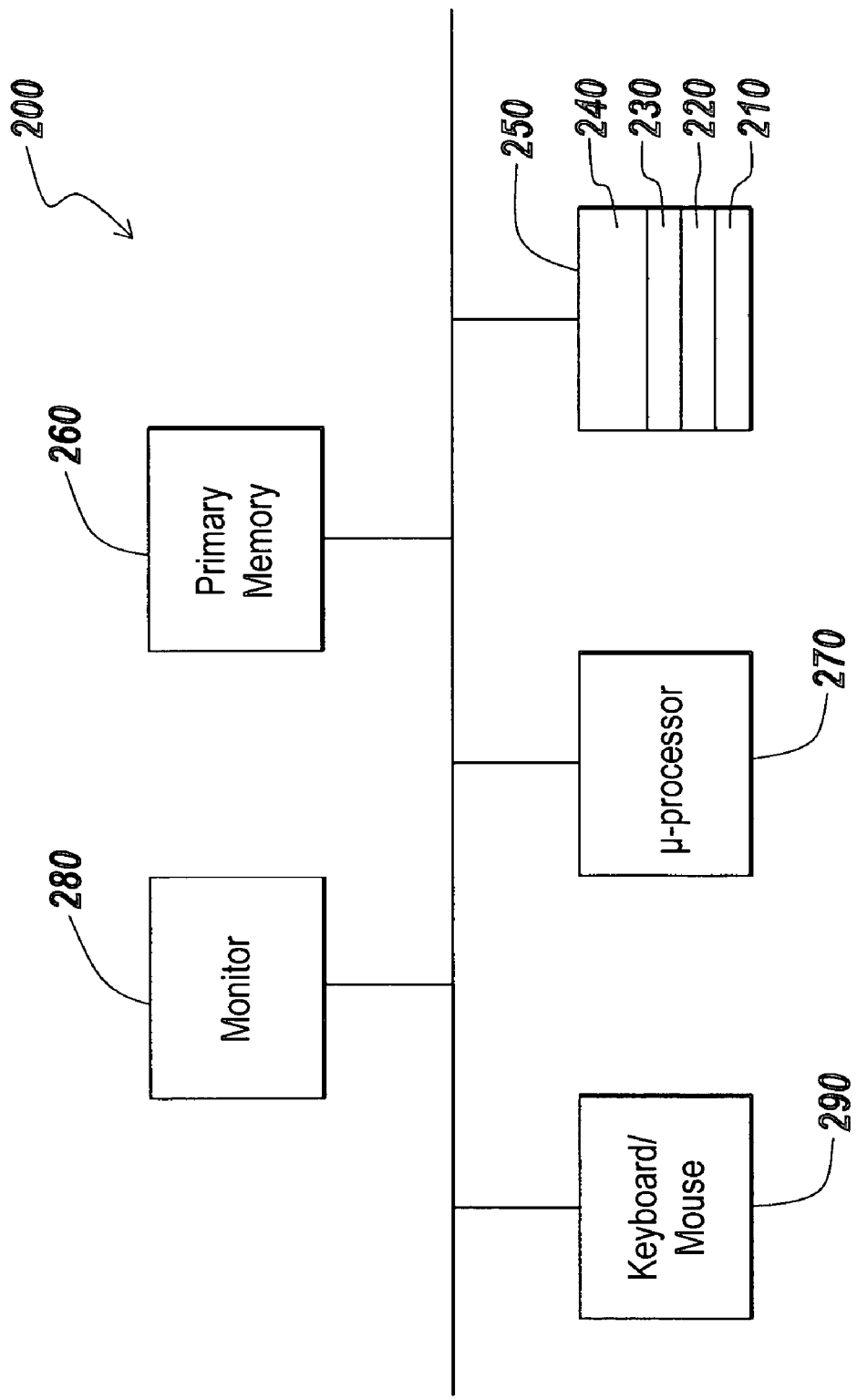
FIG. 2 is a block diagram representation of an electronic device suitable for practicing the illustrative embodiment of the present invention.

FIG. 2 is a block diagram representation of an electronic device 200 suitable for practicing the illustrative embodiment of the present invention. The electronic device 200 includes a secondary memory 250, a primary memory 260, a microprocessor 270, a monitor 280 and a keyboard/mouse 290. The microprocessor 270 controls each component of the electronic device 200 to run the software tools in the modeling and execution system 100 properly. The electronic device 200 receives the data necessary for controlling the design and simulation of a target system through the keyboard/mouse 290, such as the selection of operation modes for the latch blocks 360 and 380 (see FIG. 3). The electronic device 200 displays in the monitor 280 the result generated in the modeling and execution system 100. The primary memory 260 fetches from the secondary memory 250 and provides to the microprocessor 270 the codes that need to be accessed quickly by the microprocessor 270 to operate the electronic device 200 and to run the modeling and execution system 100. The secondary memory 250 usually contains software tools for applications. The secondary memory 250 includes, in particular, code 210 for the block library 110, code 220 for the state-based and flow diagram tool 120, code 230 for the modeling and execution tool 130, and code 240 for the application programming interface (API) of the modeling and execution system 100. The API is described below in more detail with reference to FIG. 7.

Figure 3:
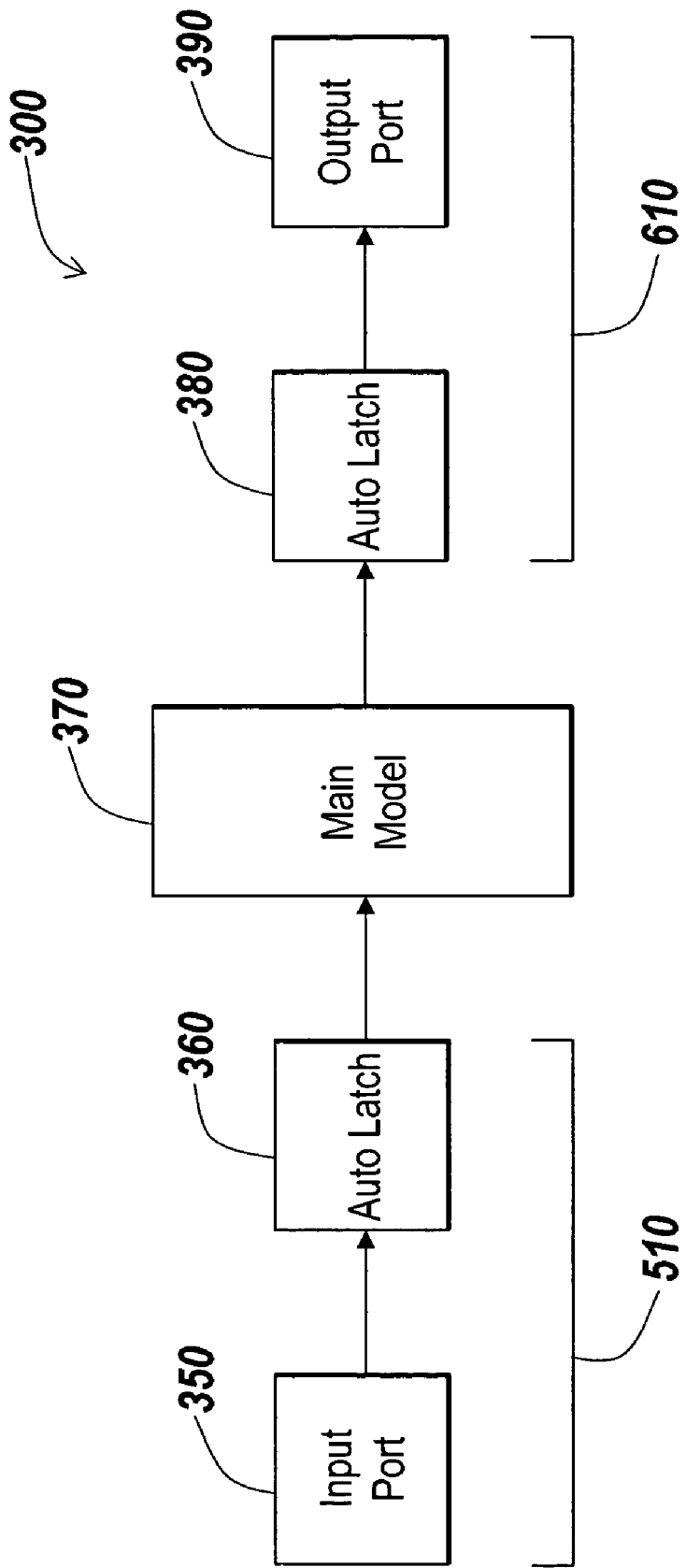
FIG. 3 is a block diagram representation of an exemplary model for a system or subsystem designed in the modeling and execution system of the illustrative embodiment of the present invention depicted in FIG. 1.

FIG. 3 is a block diagram representation of an exemplary target system (or subsystem) 300 designed in the modeling and execution system 100 in the illustrative embodiment of the present invention. The system 300 includes input port block 350, latch block 360 connected to the input port block 350, main model block 370, latch block 380 connected to output port block 390. One of skill in the art will appreciate that although the latch blocks 360 and 380 are used in block diagram modeling and execution system in the illustrative embodiment of the present invention, the latch blocks 360 and 380 may be utilized in state-based and flow diagram modeling and execution systems, data flow diagram modeling and execution systems, software diagram modeling and execution systems and other graphical modeling and execution systems, such as Unified Modeling Language (UML) diagram modeling and execution systems.

The input port block 350 is an object that links outside the system 300 into the system 300. The input port block 350 introduces input signals into the system 300. The latch block 360 is connected to input port block 350 and delivers the input signals to the main model block 370. Latch block 360 locks down the attributes of the input signals depending on the operation modes of the latch block 360 selected by users.

The operation modes are described below in more detail with reference to FIG. 4. If the latch block 360 is set to Latched Mode, the attributes of input signals are locked down, which means that the attributes of the input signals do not change although the design of the system 300 changes. In the Latched Mode, the input signals with the same attributes as locked down can pass through the latch block 360 and be applied to the main model block 370. The latch block 360 and the input port block 350 may be combined into one model block 510, which is described below in more detail with reference to FIG. 5.

The main model block 370 is implemented to be flexible with the attributes of the input and output signals, which means that the main model block 370 supports different attributes of signals that are applied to/from the main model block 370. For example, if the main model block performs the function of computing the average value of input signals, the main model block 370 compute the average value without regard to the attributes of the input signals. The attributes of signals may include dimensions (scalar, vector, matrix, etc.), complexities (real, complex), data types (Boolean, fixed-point, floating-points, integer, etc.) sample rates, etc. When the same implementation of a model can handle signals with a variety of attributes, the implementation is called "polymorphic." The polymorphism represents the ability of subclasses to respond differently to the same operation, which enables the implementation of the same method in different ways in different subclasses. One of skill in the art will appreciate that the main model block 370 includes any polymorphic implementation of systems or subsystems in the present invention.

Latch block 380 is connected between the main model block 370 and output port block 390. Latch block 380 delivers the output signals from the main model block 370 to the output port block 390 depending on the operation modes of latch block 380 selected by users. If latch block 380 is set to Latched Mode, the attributes of output signals are locked down, which means that the attributes of the output signals do not change although the design of the system 300 changes. In the Latched Mode, the output signals with the same attributes as locked down can pass through the latch block 380 and be delivered to the output port block 390. The latch block 380 and the output port block 390 may be combined into one model block 610, which is described below in more detail with reference to FIG. 6.

Figure 4:
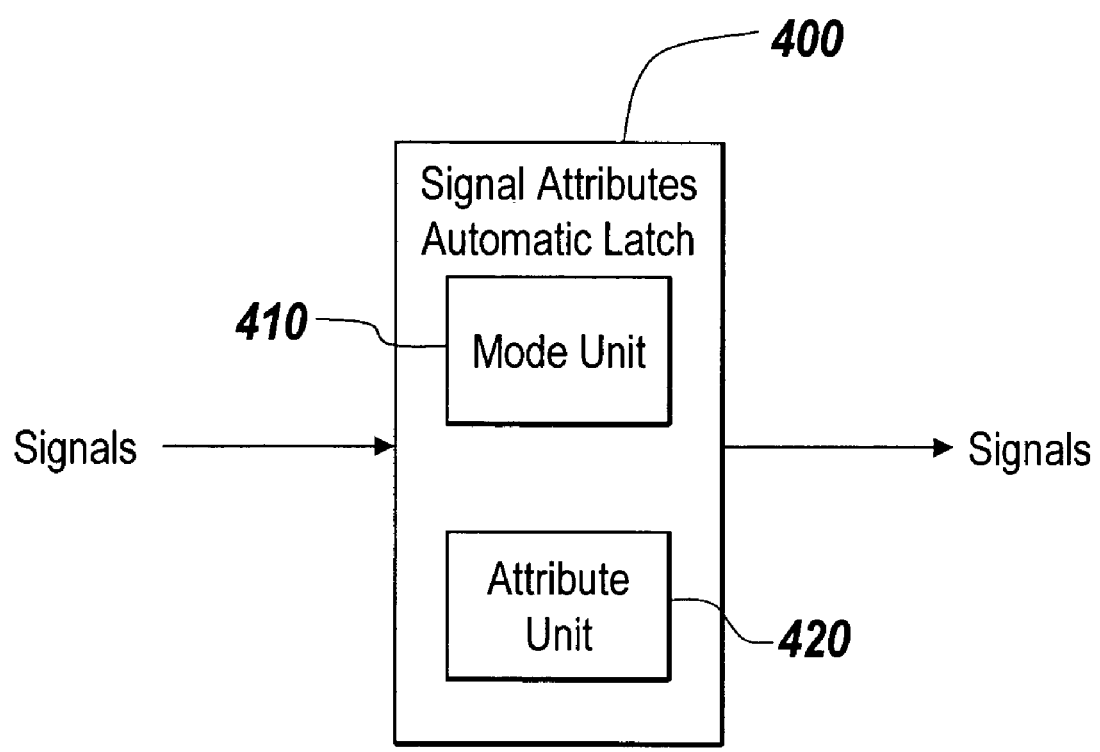
FIG. 4 is a block diagram representation of an exemplary signal attributes automatic latch block depicted in FIG. 3 in the illustrative embodiment of the present invention.

FIG. 4 is a block diagram representation of an exemplary latch block 400 that illustrates in more detail the latch blocks 360 and 380 depicted in FIG. 3 in the illustrative embodiment of the present invention. The latch block 400 includes a mode unit 410 and an attribute unit 420. The mode unit 410 determines the operation mode of the latch block 400 that may include Latched Mode, Unlatched Mode, Trap Mode, etc. The operation mode of the latch block 400 may be selected via a user interface provided by the modeling and execution system 100. For example, if users point to the latch block 400 with a mouse 290 and click the right button of the mouse 190, a graphical user interface (i.e. a context menu) may be provided with the options of the operation modes. If users select one of the operation modes provided in the user interface, the latch block 400 is set to the selected operation mode. One of skill in the art will appreciate that the user interface may be instead a textual user interface, such as a command line interface provided by the modeling and execution system 100.

In the Trap Mode when an Attribute-Trap-Event occurs, the latch block 400 automatically collects and stores information on the attributes of the signals and then automatically switches itself to Latched Mode. This process locks down the attributes of the signals. The automatic collection of the information on the attributes of the signals is described below in more detail with reference to FIG. 7. The information on the attributes of the signals is kept in the attribute unit 420 and used to lock down the attribute of signals. If the attributes of the signals are locked down, the locked signal attributes do not change regardless of the changes in the design of systems or subsystems. The attributes of the signals are also used to determine whether the signals have the same attributes as locked. If the signals have different attributes than the locked, the signals are blocked at the latch block 400 and cannot pass through the latch block 400. In the Unlatched mode, the latch block 400 is prohibited from locking down the attributes of the signals and the signals can pass through the latch block 400 without regard to the attributes of the signals. In the Trap Mode, the latch block 400 behaves the same as Unlatched mode until an Attribute-Trap-Event occurs. When users reach a suitable point in the design of the system, an Attribute-Trap-Event can be triggered. When the Attribute-Trap-Event occurs, the latch block 400 automatically collects and stores the signal attributes and changes to the Latched Mode. One of skill in the art will appreciate that the operation modes are not limited to the modes mentioned above and rather include other modes, such as Reset Mode in which the latch block 400 can be set from the Latch Mode to the Unlatch mode or Trap Mode. One of skill in the art will also appreciate that the operation specification of each mode described above is illustrative and do not limit the scope of the present invention; rather, the operation modes described above may have different specifications for operation.

Figure 5:
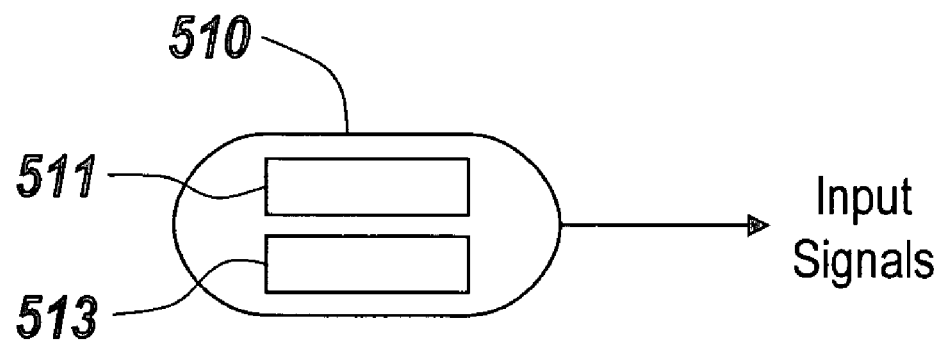
FIG. 5 is a block diagram representation of an exemplary input port block implementing a signal attributes automatic latch function in the illustrative embodiment of the present invention.

One of skill in the art will appreciate that latch block 360 connected to the input port block 350 can be implemented within the input port block 350, although the latch block 360 is implemented on its own block in FIG. 3. FIG. 5 is a block diagram representation of an exemplary input port block 510 implementing a signal attributes automatic latch function in the illustrative embodiment of the present invention. The input port block 510 performs the function of linking outside the system 300 into the system 300. In addition, the input port block 510 performs the function of locking down the attributes of the input signals. For the additional function, the input port block 510 includes a mode unit 511 and an attribute unit 513 that correspond to the mode unit 410 and the attribute unit 420, respectively, depicted in FIG. 4.

One of skill in the art will appreciate that latch block functionality can be implemented within any block that has the ability to optionally store and set at least one signal attribute. For any signal entering, leaving, or otherwise associated with a block, at least one signal attribute could be stored and set. One of skill in the art will appreciate that the ability to optionally store and set at least one signal attributes can be added to most blocks. A mechanism internal or external to the blocks can mark them as being in Trap Mode. When an Attribute-Trap-Event occurs, the signal attribute information can be automatically collected and stored in the block, and the block can be automatically configured to set the signal attributes in future use, ie act like Latched Mode.

Figure 6:
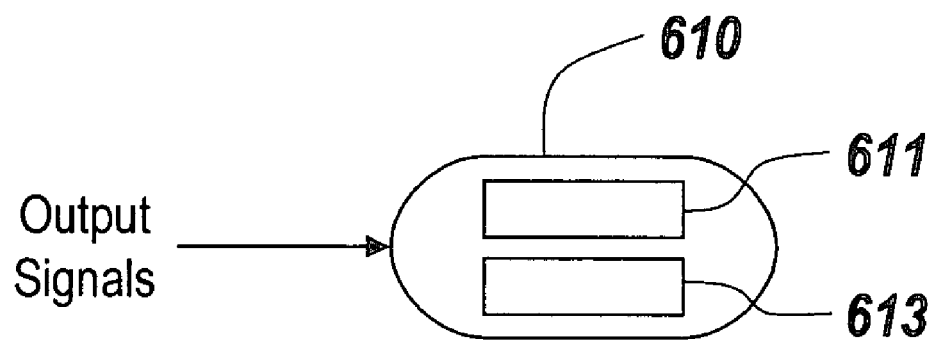
FIG. 6 is a block diagram representation of an exemplary output port block implementing a signal attributes automatic latch function in the illustrative embodiment of the present invention.

One of skill in the art will also appreciate that latch block 380 connected to the output port block 390 can be implemented within the output port block 390, although the latch block 380 is implemented on its own block in FIG. 3. FIG. 6 is a block diagram representation of an exemplary output port block 610 implementing a signal attributes automatic latch function in the illustrative embodiment of the present invention. The output port block 610 performs the function of linking the system 300 into outside the system 300. In addition, the output port block 610 performs the function of locking down the attributes of the output signals. For the additional function, the output port block 610 includes a mode unit 611 and an attribute unit 613 that correspond to the mode unit 410 and the attribute unit 420, respectively, depicted in FIG. 4. One of skill in the art will appreciate that the block representation of the elements that perform the functions of locking down the attributes of signals is illustrative and does not limit the scope of the present invention; rather the locking elements of the present invention can be represented by a different graphical icon or symbol.

Figure 7:
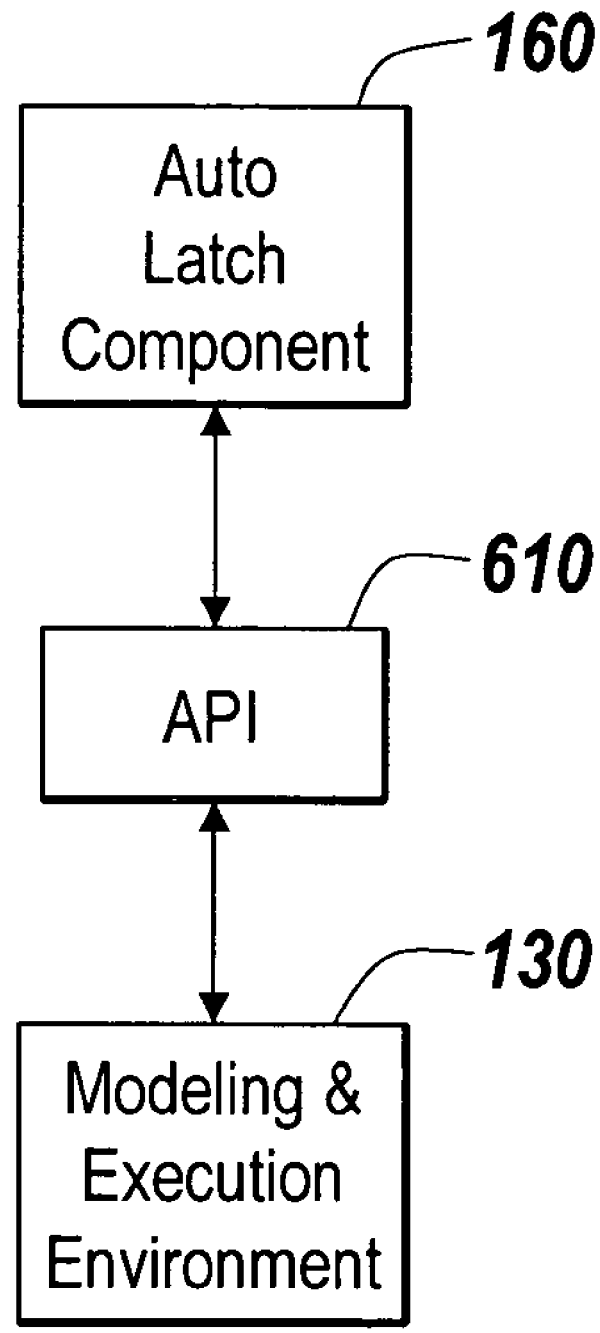
FIG. 7 is a block diagram representation of an exemplary signal attributes automatic latch block that communicates with a modeling and execution system through the application programming interface of the modeling and execution system in the illustrative embodiment of the present invention.

FIG. 7 is a block diagram illustrating the process of collecting information on the attributes of signals in the illustrative embodiment of the present invention. The latch blocks 360 and 380 communicate with the modeling and execution system 100 through the application programming interface (API) 710 for the modeling and execution system 100. The API 710 is a set of rules for writing function or subroutine calls that access functions in the modeling and execution system 100. Programs that use these rules or functions in the API calls can communicate with the modeling and execution system 100. For example, the API 710 provides functions that allow the models of systems or subsystems to be controlled, including setting information in the models and extracting information from the models. The API 710 facilitates exchanging and sharing data between the modeling and execution system 100 and other software applications.

If the latch blocks 360 and 380 are set to Trap Mode, the latch blocks 360 and 380 communicate with the modeling and execution system 100 through the API 710 of the modeling and execution system 100. Using the API 710, the latch blocks 360 and 380 may extract the information on the attributes of the input and output signals of the main model block 370. The extracted information on the attributes of the signals is stored in the latch blocks 360 and 380. The latch blocks 360 and 380 are switched to Latched Mode, and subsequently lock the attributes of the input and output signals using the information stored in the latch blocks 360 and 380.

One of skill in the art will appreciate that latch block functionality does not require the explicit mode unit shown in FIG. 4. The mode unit functionality can be implicitly implemented through match-criteria. When the Attribute-Trap-Event is invoked, match-criteria can be provided by the "invoker". For example, the match-criteria could be "all input ports and output ports at the top level of a particular subsystem". Blocks and/or signals meeting the match criteria would be implicitly treated as being in Trap Mode even though no explicit mode unit was used. When the Attribute-Trap-Event occurred, the signal attributes for the signals meeting the match criteria would be automatically collected and stored. Subsequently, the attributes would be locked. If the signals meeting the match-criteria did not have a means of storing and setting signal attributes, then a component with those means could be automatically inserted on the signal. For example, a latch block in Latched Mode could be automatically inserted.

Figure 8:
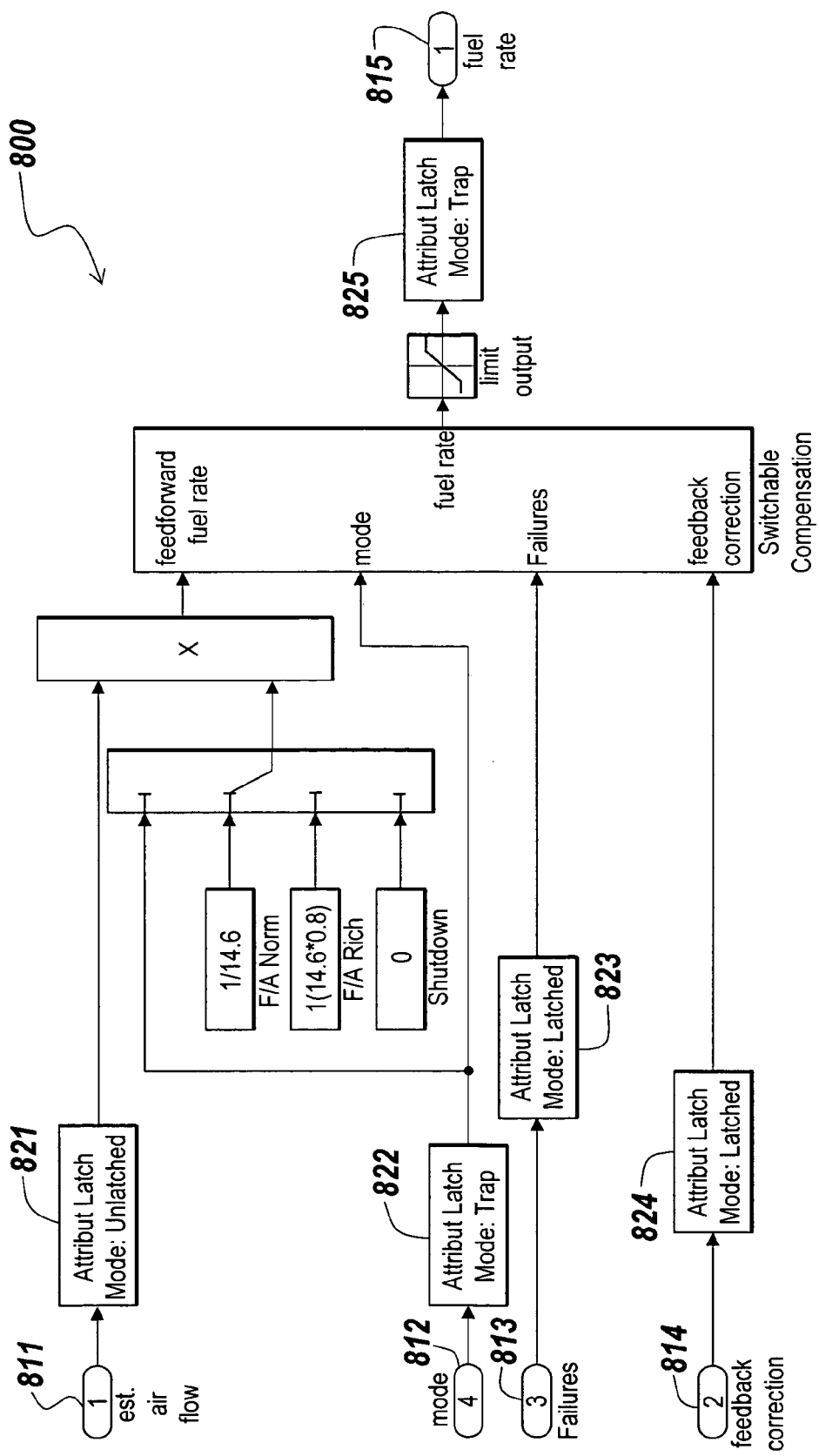
FIG. 8 is a block diagram representation of a fuel rate calculation system that employs signal attributes automatic latch blocks in the illustrative embodiment of the present invention.

FIG. 8 is a block diagram representation of a fuel rate calculation system 800 that employs the latch blocks 821-825 with various modes in the illustrative embodiment of the present invention. The system 800 receives input signals from input port blocks 811-814 and generates an output signal to an output port block 815. Latch blocks 821-825 are connected to the input port blocks 811-814 and output port block 815. Latch block 821 is connected to the input port block 811 and is set to Unlatched Mode. In the Unlatched mode, the attributes of the input signal (est. air flow) are subject to change as the design of the system 800 changes. In addition, the input signals pass through the latch block 821 regardless of the attributes of the signal. The latch blocks 823 and 824 connected to the input port blocks 813 and 814 are set to Latched Mode, and store information used to set the attributes of the input signals (failures and feedback correction). The locked down attributes of the input signals do not change as the design of the system 800 changes. In the Latch Mode, input signals with different attributes than the locked attributes are blocked by the latch blocks 823 and 824. The latch blocks 822 and 825 connected to the input port block 812 and the output port block 815, respectively, are set to T rap Mode, which behaves like Unlatched Mode until an Attributes-Trap-Event occurs. When the design of the system 800 is sufficiently complete and the attributes of the input and output signals are available, an Attributes-Trap-Event can be invoked. When the Attributes-Trap-Event occurs, the attributes of the signals are automatically collected and stored and the blocks are automatically switched from Trap Mode to Latched Mode. Subsequently, the blocks are in Latched mode and set and lock the signal attributes. One of skill in the art will appreciate that the operation modes described with reference to FIG. 8 are illustrative and do not limit the scope of the present invention. Rather, the operation modes of the present invention may include different modes or same modes with different specifications for operation.

In summary, the illustrative embodiment of the present invention provides tools for locking down the attributes of signals in modeling and execution systems. The illustrative embodiment of the present invention provides latch blocks located on the path of the signals. The illustrative embodiment of the present invention also provides signal attributes automatic latch functions for the blocks of the modeling and execution systems, such as input port blocks and output port blocks. The latch blocks may provide various operation modes including Latch Mode, Unlatch Mode, Trap Mode, etc. In the Latched Mode, the attributes of the signals are locked by the latch block, which prevent the changes in the attributes of the signals, although the design of a model changes. In the Unlatch Mode, the attributes of the signals are subject to change as the design of the model changes. In the Trap Mode, the latch block is set to the Unlatched Mode initially, and changes to the Latched Mode if a predetermined event occurs, for example, the design of the model is completed.

It will thus be seen that the invention attains the objectives stated in the previous description. Since certain changes may be made without departing from the scope of the present invention, it is intended that all matter contained in the above description or shown in the accompanying drawings be interpreted as illustrative and not in a literal sense. For example, the illustrative embodiment of the present invention may be practiced in any other modeling and execution system that provides polymorphic implementation of a model. Practitioners of the art will realize that the sequence of steps and architectures depicted in the figures may be altered without departing from the scope of the present invention and that the illustrations contained herein are singular examples of a multitude of possible depictions of the present invention.

I claim:

1. In an electronic device that runs a software tool for design and execution of a system, a method for locking at least one attribute of a signal provided from a first node to a second node, the method comprising:
providing a latch component between the first node and the second node; and
setting the latch component to a first mode in which the latch component automatically determines and locks the at least one attribute of the signal on an occurrence of a triggering event, the first mode changing to a second mode, wherein in the second mode, the at least one attribute of the signal is locked to be prevented from changing when the design of the system changes;
setting the latch component initially to a third mode in which the latch component is prohibited from locking attributes of the signal,
wherein in the third mode, a signal passes through the latch component to the second node regardless of the attributes of the signal.

2. The method of claim 1 further comprising the step of:
resetting the latch component from the second mode to the third mode.

3. The method of claim 1 wherein the latch component is placed on branches in a model of the system.

4. The method of claim 1 wherein the latch component automatically determines and locks at least one attribute of multiple signals.

5. The method of claim 1 wherein the latch component receives information from an application programming interface (API) of the design and execution software tool and automatically determines the at least one attribute of the signal based on the information received from the API of the design and execution software tool.

6. The method of claim 1 wherein the design and execution software tool includes a time-based block diagram modeling and execution system.

7. The method of claim 1 wherein the design and execution software tool includes a state-based and flow diagram modeling and execution system.

8. The method of claim 1 wherein the design and execution software tool includes a data flow diagram modeling and execution system.

9. The method of claim 1 wherein the design and execution software tool includes a software diagram modeling and execution system.

10. The method of claim 1 wherein the design and execution software tool includes a Unified Modeling Language (UML) diagram modeling and execution system.

11. The method of claim 1 wherein one of the first node and the second node includes a polymorphic implementation of a subsystem.

12. In an electronic device that runs a software tool for design and execution of a system, a method for locking at least one attribute of a signal using an existing component that performs a function in connection to the signal, the method comprising the steps of:
providing the component on a path of the signal;
providing the component with a first mode in which the component automatically determines and locks the at least one attribute of the signal on an occurrence of a triggering event, the first mode changing to a second mode; and
wherein the at least one attribute of the signal is locked to be prevented from changing in the second mode when the design of the system changes;
providing the component with a third mode and setting the latch component initially to the third mode in which the component is prohibited from locking attributes of the signal, wherein in the third mode, a signal passes through the component regardless of the attributes of the signal.

13. The method of claim 12 wherein the component is reset from the second mode to the third mode.

14. The method of claim 12 wherein the component receives information from an application programming interface (API) of the design and execution software tool and automatically determines the at least one attribute of the signal based on the information received from the API of the design and execution software tool.

15. The method of claim 12 wherein the component includes a source port component that performs the function of linking outside the system into the system.

16. The method of claim 12 wherein the component includes a destination port component that performs the function of linking the system into outside the system.

17. The method of claim 12 wherein the component includes a bidirectional port in which the signal flows into and out of the system.

18. The method of claim 12 wherein the component includes branches connecting components of the system.

19. The method of claim 12 wherein the signal are applied to/from a polymorphic implementation of a subsystem.

20. The method of claim 12 wherein the component automatically determines and locks at least one attribute of multiple signals.

21. A compute-readable medium holding instructions executable in a computer that runs a software tool for design and execution of a system, wherein a signal is provided from a first node to a second node, comprising:
prodding a latch component between the first node and the second node; and
setting the latch component to a first mode in which the latch component automatically determines and locks the at least one attribute of the signal on an occurrence of an triggering event, the first mode changing to a second mode,
wherein the at least one attribute of the signal is locked and prevented from changing in the second mode when the design of the system changes;
setting the component to a third mode in which the component is prohibited from locking attributes of the signal,
wherein in the third mode, the signal flows through the component to the second node regardless of the attributes of the signal.

22. The medium of claim 21 wherein the latch component receives information from an application programming interface (API) of the design and execution software tool and automatically determines the at least one attribute of the signal based on the information received from the API of the design and execution software tool.

23. The medium of claim 21 wherein the latch component automatically determines and locks at least one attribute of multiple signals.

24. A system for locking at least one attribute of a signal provided from a first node to a second node in a model, the system comprising:
a mode unit for setting the system to a first mode in which the system automatically determines and locks the at least one attribute of the signal on an occurrence of a triggering event; and
an attribute unit for storing the at least one attribute of the signal,
wherein the first mode changes to a second mode on the occurrence of the triggering event in which the at least one attribute of the signal is locked to be prevented from changing when the design of the system changes;

wherein the mode unit sets the system initially to a third mode in which the system is prohibited from locking the at least one attribute of the signal, wherein in the third mode, the signal passes through the system to the second node regardless of attributes of the signal.

25. The system of claim 24 wherein the mode unit resets the system from the second mode to the third mode.

26. The system of claim 24, further comprising:
an application programming interface (API) for automatically determining the at least one attribute of the signal.

27. The system of claim 24 wherein the model comprises at least one of a time-based block diagram, a state-based and flow diagram, and a data flow diagram.

28. The system of claim 24 wherein one of the first node and the second node comprises a polymorphic implementation of a subsystem.

29. The system of claim 24 wherein the system comprises at least one of a signal latch component, a source port component and a destination port component.

30. The system of claim 24, wherein the system comprises a bidirectional port in which the signal flows into and out of the system.

31. The system of claim 24, wherein the system comprises branches connecting components of the system.

* * * * *

UNITED STATES PATENT AND TRADEMARK OFFICE
CERTIFICATE OF CORRECTION

PATENT NO. : 7,350,189 B1
APPLICATION NO. : 10/719904
DATED : March 25, 2008
INVENTOR(S) : Bartlett It is certified that error appears in the above-identified patent and that said Letters Patent is hereby corrected as shown below:

Column 1, line number 21, change "diagrams, and state-based" to --diagrams, state-based--

Column 1, line number 31, change "blocks," to --blocks;--

Column 3, line number 33, change "mode in which" to --mode, in which--

Column 4, line number 21, change "collect" to --collected--

Column 4, line number 66, change "systems," to --systems;--

Column 5, line number 14, change "blocks, that" to --blocks that--

Column 5, line number 32, change "parallel states and" to --parallel states, and--

Column 7, line number 18, change "compute" to --computes--

Column 8, line number 26, change ", such as" to --such as,--

Column 8, line number 35, change "block 350, although" to --block 350; although,--

Column 9, line number 11, change "rather" to --rather,--

Column 10, line number 37, change "such as" to --such as,--

UNITED STATES PATENT AND TRADEMARK OFFICE
CERTIFICATE OF CORRECTION

PATENT NO. : 7,350,189 B1
APPLICATION NO. : 10/719904
DATED : March 25, 2008
INVENTOR(S) : Bartlett It is certified that error appears in the above-identified patent and that said Letters Patent is hereby corrected as shown below:

Column 10, line number 46, change "initially," to --initially--

Signed and Sealed this

First Day of July, 2008

JON W. DUDAS
*Director of the United States Patent and Trademark Office*